United States Patent
Van Neer et al.

(10) Patent No.: US 11,175,165 B2
(45) Date of Patent: Nov. 16, 2021

(54) ACOUSTIC MEASUREMENT OF A FLUID FLOW

(71) Applicant: Nederlandse Organisatie voor toegepast-natuurwetenschappelijk onderzoek TNO, s-Gravenhage (NL)

(72) Inventors: Paul Louis Maria Joseph Van Neer, Bergschenhoek (NL); Daniele Piras, Amsterdam (NL); Uilke Stelwagen, Den Hoorn (NL); Erwin Johannes Martinus Giling, Delft (NL)

(73) Assignee: NEDERLANDSE ORGANISATIE VOOR TOEGEPAST-NATUURWETENSCHAPPELIJK ONDERZOEK TNO, The Hague (NL)

( * ) Notice: Subject to any disclaimer, the term of this patent is extended or adjusted under 35 U.S.C. 154(b) by 28 days.

(21) Appl. No.: 16/641,592

(22) PCT Filed: Aug. 28, 2018

(86) PCT No.: PCT/NL2018/050555
§ 371 (c)(1),
(2) Date: Feb. 24, 2020

(87) PCT Pub. No.: WO2019/045561
PCT Pub. Date: Mar. 7, 2019

(65) Prior Publication Data
US 2020/0200578 A1    Jun. 25, 2020

(30) Foreign Application Priority Data
Aug. 29, 2017   (EP) .................................... 17188346

(51) Int. Cl.
*G01F 1/66* (2006.01)

(52) U.S. Cl.
CPC .............. *G01F 1/662* (2013.01); *G01F 1/667* (2013.01)

(58) Field of Classification Search
CPC ......... G01F 1/662; G01F 1/667; G01F 15/006
See application file for complete search history.

(56) References Cited

U.S. PATENT DOCUMENTS

| 4,024,760 A | * | 5/1977 | Estrada, Jr. | ............... G01F 1/66 73/861.31 |
| 4,109,523 A | * | 8/1978 | Teyssandier | ............ G01F 1/667 73/861.31 |

(Continued)

FOREIGN PATENT DOCUMENTS

| EP | 2228631 A1 | 9/2010 |
| EP | 2887036 A1 | 6/2015 |

(Continued)

OTHER PUBLICATIONS

K. Amri et al., "Asymmetric Flow Velocity Profile Measurement using Multipath Ultrasonic Meter with Neural Network Technique", 2017 5th International Conference on Instrumentation, Control, and Automation (ICA) Yogyakarta, Indonesia, Aug. 9-11, 2017, pp. 146-150.

(Continued)

*Primary Examiner* — Manuel A Rivera Vargas
*Assistant Examiner* — Yaritza H Perez Bermudez
(74) *Attorney, Agent, or Firm* — Pillsbury Winthrop Shaw Pittman, LLP

(57) ABSTRACT

Methods and systems for measuring a fluid flow comprise a plurality of transceivers disposed at predetermined locations distributed along a perimeter around the fluid flow. The transceivers transmit and receive acoustic signals through the fluid flow there between. A plurality of different acoustic paths through the fluid flow are formed between different transceiver pairs. Different time intervals are measured (Continued)

between respective times of transmitting and receiving the acoustic signals; and along the plurality of different acoustic paths. A velocity map of the fluid flow is calculated by fitting the measured different time intervals to a model of the fluid flow. The model of the fluid flow defines a velocity map with different flow velocities in a cross-section plane transverse to the fluid flow.

15 Claims, 9 Drawing Sheets

(56) References Cited

U.S. PATENT DOCUMENTS

| | | | | |
|---|---|---|---|---|
| 4,317,178 | A * | 2/1982 | Head | G01F 1/00 |
| | | | | 702/47 |
| 4,432,243 | A * | 2/1984 | Lowell | G01F 1/66 |
| | | | | 702/48 |
| 4,839,824 | A * | 6/1989 | Ando | G01B 11/245 |
| | | | | 348/139 |
| 6,067,861 | A * | 5/2000 | Shekarriz | G01F 1/663 |
| | | | | 367/89 |
| 6,158,288 | A * | 12/2000 | Smith | G01F 1/667 |
| | | | | 73/861.25 |
| 6,595,071 | B1 * | 7/2003 | Doten | A61B 8/06 |
| | | | | 73/861.29 |
| 8,573,026 | B2 * | 11/2013 | Froehlich | G01F 25/0007 |
| | | | | 73/1.34 |
| 9,279,707 | B2 * | 3/2016 | Wiest | G01F 1/662 |
| 10,371,551 | B2 * | 8/2019 | Mei | G01F 1/663 |
| 10,801,868 | B2 * | 10/2020 | Dabak | G01F 1/662 |
| 2012/0144930 | A1 * | 6/2012 | Aughton | G01F 1/667 |
| | | | | 73/861.28 |
| 2013/0080081 | A1 * | 3/2013 | Dugger | G01F 1/663 |
| | | | | 702/48 |
| 2014/0107950 | A1 * | 4/2014 | Dabak | G01F 1/66 |
| | | | | 702/48 |
| 2015/0160053 | A1 * | 6/2015 | Baumoel | B06B 1/0215 |
| | | | | 73/861.28 |
| 2016/0305805 | A1 * | 10/2016 | Baumoel | G01F 1/663 |
| 2017/0273658 | A1 * | 9/2017 | Wang | A61B 8/5223 |
| 2021/0033440 | A1 * | 2/2021 | Savery | G01S 15/8984 |

FOREIGN PATENT DOCUMENTS

| | | |
|---|---|---|
| EP | 2990768 A1 | 3/2016 |
| WO | 2015/068154 A1 | 5/2015 |
| WO | 2015/150801 A1 | 10/2015 |

OTHER PUBLICATIONS

International Search Report dated Jan. 7, 2019 issued in corresponding International Patent Application No. PCT/NL2018/050555 (3 pgs.).

Written Opinion of the International Searching Authority dated Jan. 7, 2019 issued in corresponding International Patent Application No. PCT/NL2018/050555 (6 pgs.).

* cited by examiner

ACOUSTIC MEASUREMENT OF A FLUID FLOW

CROSS-REFERENCE TO RELATED APPLICATIONS

This is the U.S. National Stage of PCT/NL2018/050555, filed Aug. 28, 2018, which in turn claims priority to European Patent Application No. 1788346.5, filed Aug. 29, 2017, the contents of each of these applications being incorporated herein by reference in their entireties.

ACKNOWLEDGEMENT

The project leading to this disclosure has received funding from the European Union's Horizon 2020 research and innovation programme under grant agreement No 636942.

TECHNICAL FIELD AND BACKGROUND

The present disclosure relates to methods and systems for measuring a fluid flow, e.g. an acoustic rheometer.

A large number of liquids used in the oil & gas, chemical and food industry exhibit non-Newtonian behavior. Liquids with non-Newtonian behavior have a viscosity which depends on the applied shear rate. Thus their viscosity depends on the velocity with which the liquid flows. Often this relation also depends on other variables such as the temperature. Examples of these are polymer-mixtures, emulsions and suspensions. This property is a complicating factor in the mixing of liquids, the filling of packages and the dosing of specific amounts. For these and other applications, an in-line sensor, which is able to measure e.g. the viscosity as function of the shear rate and suitable for process control, would be desirable. This is not easy, as most viscosity sensors rely on inserting something into the flow, which changes the flow and therefore strongly affects the apparent viscosity at the insertion point (it also may initiate the deposition of fouling).

For example, WO 2015/068154 discloses a system for performing the inline measurements of flow rate, density, and rheology of a flowing fluid. The known system proposes e.g. an NMR spectrometer for measuring a velocity profile of the flowing fluid. Unfortunately, NMR can be expensive, complicated and may not be applicable for all circumstances. Also, ultrasonic based measurements are mentioned which typically rely on measuring the fluid velocity based on the Doppler shift. As further background, Amri et al. [2017 5th International Conference on Instrumentation, Control, and Automation (ICA) Yogyakarta, Indonesia] describes asymmetric flow velocity profile measurement using multipath ultrasonic meter with neural network technique. U.S. Pat. No. 6,067,861 A describes a method and apparatus for ultrasonic Doppler velocimetry using speed of sound and reflection mode pulsed wideband Doppler. WO 2015/150801 A1 describes a fluid sensor with a fluid conduit having a wall defining a fluid flow path and an acoustic transducer located externally of the fluid flow path. EP 2 990 768 A1 describes an ultrasonic flow rate measurement system.

There remains a desire for more accurate and versatile non-intrusive measurements of a fluid flow applicable under various circumstances and types of flow.

SUMMARY

Aspects of the present disclosure relate to methods and systems for measuring a fluid flow. Preferably, a plurality of transceivers are distributed along a perimeter around the fluid flow. The transceivers are configured to transmit and receive acoustic signals through the fluid flow there between. The transceivers can be grouped to form a plurality of transceiver pairs. A respective transceiver pair forms or defines a respective shortest or direct acoustic path along a straight line through the fluid flow there between. A plurality of different such acoustic paths are thus formed between different transceiver pairs. Advantageously, a velocity map of the fluid flow can be calculated by fitting a measurement of the plurality of time intervals to a model of the fluid flow.

By sampling the flow regions using the measured time intervals of multiple different intersecting acoustic paths, the velocity per flow region can be extracted. It will be appreciated that a distribution of just a few transceivers around the fluid flow can form many different pairs, each providing an acoustic path. By using omnidirectional transceivers, each transceiver may cooperate with multiple other transceivers to be part of different pairs. By arranging the transceivers in a flat cross-section plane that is at an oblique angle with respect to the flow direction, the number of transceivers can be optimally utilized. By tilting the flat plane of transceivers more, time differences between upstream and downstream signals may become more significant and can be used to more accurately determine the flow velocities. By using the wall containing the fluid flow as part of the transceiver, there is minimal or no disturbance to the flow. For example, the transceiver can be placed in a slot or the whole wall can be thinned to send acoustic signals through the wall.

For example, the model may define a velocity map with different flow velocities in a cross-section plane transverse to the fluid flow. The velocity map can thus be mapped onto respective lengths of each of the plurality of different acoustic paths to determine the different flow velocities along said lengths of the different acoustic paths in accordance with the velocity map. The flow velocities along the lengths of the respective acoustic paths may determine respective time intervals between respective times of transmitting and receiving the acoustic signals along the plurality of acoustic paths.

Further constraints can be placed on the model to improve the stability of the fit. For example a centrosymmetric flow may be assumed in a round pipe. Accordingly, the velocity map can be an (axisymmetric) profile. For example, the model may comprise discrete flow regions having respective flow velocities. Alternatively, a continuous model can be used, e.g. constraining a shape of the velocity map, e.g. in accordance with a Carreau fit. By using multiple acoustic paths which intersect differently with the flow regions or continuous flow according to more linearly independent sets of sub-lengths or vectors, the fit may also become more stable. Using the velocity map combined e.g. with pressure difference measurements, other rheological quantities such as the viscosity, the shear rate, and the shear stress may also be determined. Alternatively, or in addition to modeling the velocity map, also other rheological models can be used. For example, a model of rheological parameters such as the viscosity, shear rate, and/or shear stress can be used to calculate a velocity map which can be fitted to measured time intervals.

BRIEF DESCRIPTION OF DRAWINGS

These and other features, aspects, and advantages of the apparatus, systems and methods of the present disclosure will become better understood from the following description, appended claims, and accompanying drawing wherein:

FIG. 3A schematically illustrates an arrangement of transceivers and the acoustical paths though the fluid flow there between;

DESCRIPTION OF EMBODIMENTS

Figure 1A:
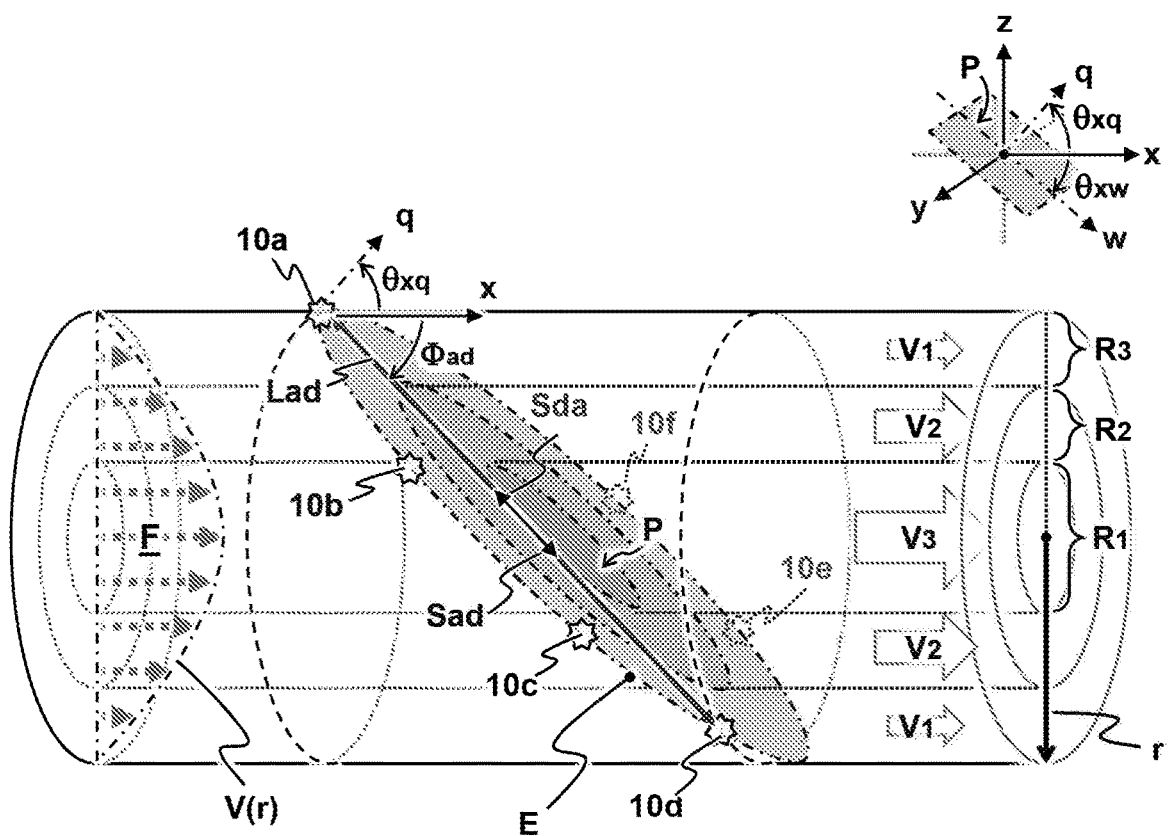
FIG. 1A schematically illustrates an perspective view of an embodiment for measuring a fluid flow.

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

Figure 1B:
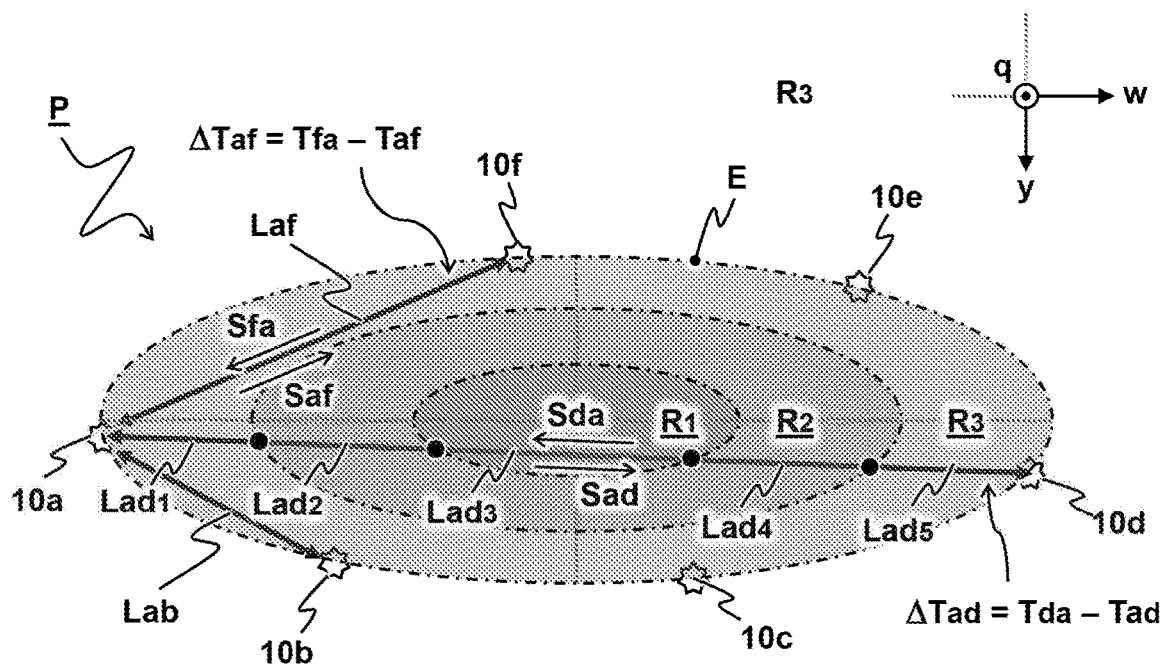
FIG. 1B schematically illustrates a view of a flat plane through the fluid flow formed by transceivers at its perimeter.

FIG. 1A schematically illustrates a perspective view of an embodiment for measuring a fluid flow F. FIG. 1B schematically illustrates a top view of the flat plane P through the fluid flow formed by transceivers at its perimeter E.

In one embodiment, a plurality of transceivers $10a$-$10f$ are disposed at predetermined locations distributed along a perimeter E around the fluid flow F. As described herein, the transceivers $10a$-$10f$ are configured to transmit and receive acoustic signals Sda,Sad,Saf,Sfa through the fluid flow F there between. The transceivers $10a$-$10f$ may comprise a plurality of transceiver pairs $10a$,$10d$; $10a$,$10f$. As shown, a respective transceiver pair $10a$,$10d$ may form or define a respective (shortest or direct) acoustic path Lad along a (straight) line through the fluid flow F there between. Accordingly, a plurality of different such acoustic paths Lad,Laf through the fluid flow F can be formed between different transceiver pairs e.g. $10a$,$10d$ or $10,10f$.

In a preferred embodiment, different time intervals, e.g. Tad,Tda,Taf,Tfa etc., are measured between respective times of transmitting and receiving the acoustic signals, e.g. Sad, Sda,Saf,Sfa etc., along the plurality of different acoustic paths, e.g. Lad,Laf etc. Typically, the fluid flow F may comprise a velocity map V which can be approximated or modeled. In some embodiments, a model of the fluid flow F is used to define a velocity map V with different flow velocities in a cross-section plane transverse to the fluid flow F. Accordingly, the velocity map V of the fluid flow F can be calculated by fitting the measured different time intervals to the model of the fluid flow F.

In some embodiments, the velocity map V is mapped onto respective lengths of each of the plurality of different acoustic paths to determine the different flow velocities V1,V2,V3 along said lengths of the different acoustic paths Lad,Laf in accordance with the velocity map V. For example, the flow velocities V1,V2,V3 along the lengths of the respective acoustic paths Lad,Laf can be used to calculate modeled different time intervals between the respective times of transmitting and receiving the acoustic signals along the plurality of acoustic paths. Accordingly, the measured different time intervals Tad,Tda,Taf,Tfa are fitted to the modeled different time intervals in accordance with the velocity map V.

In the embodiment shown, the model comprises dividing the fluid flow F into flow regions R1,R2,R3 having respective flow velocities V1,V2,V3. Preferably, each acoustic path Lad intersects differently with the flow regions R1,R2, R3 of the fluid flow F according to a respective set of sub-lengths Lad1-Lad5 of the intersecting acoustic path Lad per flow region R1,R2,R3. Each acoustic path may have a different set of sub-lengths, e.g. the sets are linearly independent. For example, the acoustic paths Laf and Lab have different path lengths in this case only in the flow region R3. In some embodiments, the flow velocities V1,V2,V3 of the fluid flow F are calculated e.g. based on the plurality of measured time intervals Tad,Tda,Taf,Tfa and sets of sub-lengths Lad1-Lad5 for the different acoustic paths Lad,Laf. For example, each time interval of a respective acoustic path is associated with a respective set of sub-lengths for that respective acoustic path.

In a preferred embodiment, e.g. as shown, the perimeter E formed by the locations of the transceivers $10a$-$10f$ spans a flat transceiver plane P through the fluid flow F. More preferably the flat transceiver plane P has a normal vector q that is at an oblique angle θxq with respect to a main flow direction x of the fluid flow F. As used herein, an oblique angle is an angle that is not a right angle or any multiple of a right angle. For example, the angle θxq is between five and eighty-five degrees plane angle. Preferably the angle is more than twenty, forty, sixty, or even seventy degrees to achieve higher time differences between upstream and downstream signals. Preferably the angle is not too high depending on signal loss in the fluid, e.g. around seventy five degrees.

In one embodiment (not shown), two or more transceivers planes are used, each with different oblique angles $\theta_{qx}$. For example, a plurality of transceivers may span two ellipses which may optionally intersect each other. For example, the transceiver plane with relatively small oblique angle $\theta_{qx}$, may work better in liquids with high sound attenuation, whereas the transceiver plane with relatively high oblique angle $\theta_{qx}$ may work better in liquids with low sound attenuation (and would allow for more measurement accuracy then the other ellipse in this situation). There can also be transceivers at the intersection which are part of both transceiver planes. Each transceiver plane may be spanned by at least three transceivers, preferably more, e.g. at least four, five, six, seven, or more.

In one embodiment, a first transceiver 10a of a respective transceiver pair 10a,10d is upstream of the fluid flow F with respect to a second transceiver 10d of the respective transceiver pair 10a,10d. In a further embodiment, a first time interval Tad is measured that it takes a first acoustic signal Sad to travel downstream from the first transceiver 10a to the second of transceiver 10d. In another or further embodiment, a second time interval Tda is measured that it takes a second acoustic signal Sda to travel upstream from the second transceiver 10d to the first transceiver 10a. In some embodiments, a time difference ΔTad between the first time interval Tad and the second time interval Tda is calculated. Accordingly, the flow velocity V1,V2,V3 per flow region R1,R2,R3 may be calculated based on a plurality of time differences ΔTad, ΔTaf between the measured time intervals Tad,Tda,Taf,Tfa of different transceiver pairs 10a,10d; 10a, 10f.

Typically, the first time interval Tad of the downstream traveling first acoustic signal Sad is shorter than the second time interval Tda of the upstream traveling second acoustic signal Sda. In some cases, this may be different if the flow goes in the other direction which could occur e.g. with backflow of non-developed flow e.g. with vortices. It will be appreciated that the travel time Tda of an acoustic signal Sad along an acoustic path Lad can be a function of an acoustic wave speed C of the acoustic signal Sad in the fluid, the path length Lad1-Lad5 of the acoustic path Lad per flow region R1,R2,R3, and a component of the respective flow velocity V1,V2,V3 per flow region in a direction of the traveling acoustic signal Sad.

In some embodiments, the component of the flow velocity V in a direction of the traveling acoustic signal is determined by an angle Φad between a direction of the acoustic path Lad and the flow direction x of the fluid flow F. For example, an effect of the flow velocity V on the time intervals Tad,Tda can be dependent on the path angle Φad between a direction of the acoustic path Lad and the flow direction x of the fluid flow F. In some embodiments, each acoustic path Lad has a respective path angle Φad with respect to a flow direction x of the fluid flow F, wherein the flow velocity V1,V2,V3 per flow region R1,R2,R3 is calculated based also on the path angles Φad for each of the different acoustic paths.

Generally, the time intervals Tad, Tda and the time difference ΔTad may correlate with the profile of flow velocities V of the fluid flow F along the acoustic path Lad. Without being bound by theory, the correlation may be modelled or approximated for some embodiment. In one embodiment, the time interval Tad that it takes an acoustic wave Sad to travel (in a straight line) along the length of the acoustic path Lad from the first transceiver 10a to the second transceiver 10d can be written as the sum of the sub-lengths Lad1 . . . Lad5 that make up this path, wherein each sub-length is divided by the respective velocity of the wave along that sub length. For example, assuming that the velocity map or profile V(r) of the fluid flow F can be approximated by the velocities V1,V2,V3 in the cylindrical flow regions R1,R2,R3, respectively, the time can be written as $$T_{ad} = \frac{L_{ad1} + L_{ad5}}{C + V_1 \cos\Phi_{ad}} + \frac{L_{ad2} + L_{ad4}}{C + V_2 \cos\Phi_{ad}} + \frac{L_{ad3}}{C + V_3 \cos\Phi_{ad}}$$

where the effective acoustic velocity is determined by the acoustic wave velocity C in the fluid (if it were standing still), which (for a downstream signal is increased by the component (cos $\Phi_{ad}$) of the fluid velocity Vk in the direction of the traveling wave. In one embodiment, the acoustic wave velocity of the liquid is measured by averaging the measured up and downstream velocities. The component depends on the angle $\Phi_{ad}$ between the vector of the flow direction (x) and the vector along the traveling wave, i.e. the line between the between transceivers 10a and 10d. Note that to measure the influence of the fluid velocity on the timing of the signal, it is preferred that there should be an appreciable component (cos $\Phi_{ad}$), i.e. the angle between the fluid flow and the line connecting the transceivers should be less than ninety degrees, preferably less than eighty degrees, less than fifty degrees, or less, e.g. between one and thirty degrees. The smaller the angle, the more the timing of the signal will be affected by the flow velocity. On the other hand the smaller the angle, the longer the path length and the smaller the signal, e.g. because of attenuation due to losses and beam spreading.

Additionally, the time interval Tda can be calculated for the time that it takes for the acoustic wave traveling the opposite direction:

$$T_{ad} = \frac{L_{ad1} + L_{ad5}}{C - V_1 \cos\Phi_{ad}} + \frac{L_{ad2} + L_{ad4}}{C - V_2 \cos\Phi_{ad}} + \frac{L_{ad3}}{C - V_3 \cos\Phi_{ad}}$$

where the acoustic wave now has to travel upstream meaning that the acoustic wave velocity C is decreased by the component (cos Φad) of the fluid velocity V in the direction of travel.

For a general pair of transceivers "i" and "j", the time interval Tij can be written as $$T_{ij} = \sum_k \frac{L_{ij,k}}{C \pm V_k \cos\Phi_{ij}}$$

where the fluid flow is divided in "k" flow regions; Lij,k are the sub-lengths of the acoustic path Lij between the transceivers "i" and "j" intersecting with respective flow regions "k"; C is the acoustic wave velocity in the fluid (if it were standing still); Vk is the fluid velocity in region "k"; and Φij is the angle between the direction (x) of the flow and the direction of the traveling acoustic wave (straight line between the transceivers).

The sub-lengths Lij,k can be calculated for each transceiver pair "i" and "j" as the lengths of its acoustic path Lij (line piece there between) intersecting with the flow regions "k". By measuring the corresponding time intervals Tij, in principle, the above formula can be used to fit or calculate flow velocities Vk per flow region "k". However, the quality of the fit or calculation can be unstable depending on the assumed subdivision of flow regions "k". In one embodiment, the measured time intervals Tij are predominantly determined by the acoustic wave velocity C which is generally much larger than the respective flow velocities Vk. of the fluid flow.

For some cases, the calculation or fit can be improved using a time difference ΔTij between the time intervals Tji (upstream traveling wave) and Tij (downstream traveling wave) between the respective pairs of transceivers "i" and "j". This can be written as:

$$\Delta T_{ij} = T_{ji} - T_{ij} = \sum_k \frac{L_{ij,k}}{C - V_k \cos\Phi_{ij}} - \sum_k \frac{L_{ij,k}}{C + V_k \cos\Phi_{ij}} =$$

$$\sum_k \frac{L_{ij,k} \cdot (C + V_k \cos\Phi_{ij}) - L_{ij,k} \cdot (C - V_k \cos\Phi_{ij})}{C^2 - (V_k \cos\Phi_{ij})^2} =$$

$$2\cos\Phi_{ij} \cdot \sum_k \frac{L_{ij,k} \cdot V_k}{C^2 - (V_k \cos\Phi_{ij})^2}$$

which can be further simplified assuming that the acoustic wave velocity C is much larger than the fluid velocity Vk:

$$\Delta T_{ij} \approx \frac{2\cos\Phi_{ij}}{C^2} \cdot \sum_k L_{ij,k} \cdot V_k$$

This model can be used in some embodiments to fit the unknown flow velocities Vk of predetermined flow regions "k" using as input the measured time differences ΔTij of different acoustic paths and the calculated sub-lenghts Lij,k of the intersecting lines and angles Φij. Alternatively to fitting, the velocities can also be calculated directly, e.g. using linear regression. For example, the formula can be written as a matrix equation $$[\Delta T_{ij}] = [L'_{ij,k}][V_k]$$

where the factors (2 cos Φij)/C² can be absorbed into the matrix of modified sub-lengths $L'_{ij,k}$. The number of rows in the matrix $[L'_{ij,k}]$ is equal to the number of time differences ΔTij measured and the number of columns is determined by the number of flow regions "k" in which the flow is divided according to a model. The wave velocities Vk can now be calculated from the measured time intervals ΔTij as $$[V_k] = [L'_{ij,k}]^{-1}[\Delta T_{ij}]$$

where $[L'_{ij,k}]^{-1}$ is the inverted matrix of modified sub-lengths.

Whether the fit or calculation results in a stable or accurate solution may depend on a number of factors including e.g. the accuracy with which the time intervals Tij or time differences ΔTij can be measured; the number of flow regions "k" which are predetermined or modelled, the uniqueness (linear independence) of the sets of line pieces Lij,k which is determined by the number the transceivers and the accuracy with which their positions can be determined, and the angles Φij between the receiver pairs which should preferably have a sufficient component in the direction of flow (otherwise no time difference is measured).

For example, if water is used as the flow medium having an acoustic velocity C≈1500 m/s, and a transceiver pairs is placed at a distance of Lij=0.10 m and an angle Φij=15.0 degrees with respect to the flow direction. For a flow velocity V=1 m/s (one flow region "k"), the time difference ΔTij between the upstream and downstream traveling signals would be:

$$\Delta T_{ij} \approx \frac{2\cos(15)}{\left(1500 \frac{m}{s}\right)^2} \cdot \left(0.1\ m \cdot 1\ \frac{m}{s}\right) = 0.086\ \mu s$$

So the accuracy of recording the time intervals Tij and Tji for determining the flow velocity V in this typical scenario should preferably be better than microseconds, e.g. with a time resolution of less than hundred nanoseconds, less than ten nanoseconds, less than one nanosecond, or even less, e.g. in a picosecond regime.

Alternatively, or in addition, the accuracy with which the relative positions of the transceivers "i" and "j" is determined, can also influence the calculated flow velocity V, e.g. via the angle Φij and sub-lengths Lij,k calculated on the basis of the relative positions. More accuracy may be needed, e.g. if more flow regions "k" are used in the model, i.e. the more fine-grained the determination of different flow velocities Vk is to be determined. Also, the transceivers should preferably be distributed such that each can provide a different "sampling" of the flow regions, i.e. having different (linearly independent) sets of sub-lengths Lij,k intersecting with the flow regions "k".

In one embodiment, the flow velocity V1,V2,V3 per flow region R1,R2,R3 is calculated by fitting measured time differences ΔTad for a plurality of acoustic paths Lij to a model with a variable flow velocity Vk per flow region k. In some embodiments, the flow velocity V is modeled as a centrosymmetric flow. For example, the velocity map can be an (axisymmetric) velocity profile. In other or further embodiments, the flow velocity V is a function only of a radial distance r from a center of the fluid flow F. For example, the fluid flow F is measured inside a round tube. For example, the fluid flow F is modelled by dividing the flow into flow regions according to concentric cylinders R1-R3 through which the fluid flows in a flow direction x along a length of the tube with a respective flow velocity V1-V3. Alternatively other velocity maps can be modelled.

Alternatively to using a model with discrete flow regions, also a continuous model can be used. For example the sum in the formulas above can be replaced by an integral. For example, additional constraints can be put onto the function V describing the velocity map to improve the fit. Also other parameters can be used as input to the fit, e.g. rheological parameters that yield a corresponding velocity map. Generally, a continuous or discrete model with free parameters and/or constraints defining flow velocities can be fitted to, or calculated in accordance with, a set of measured time intervals or time differences over a plurality of different acoustic paths sufficiently sampling the flow, e.g. acoustic paths that can be modeled with linearly independent sets of parameters.

Figure 2:
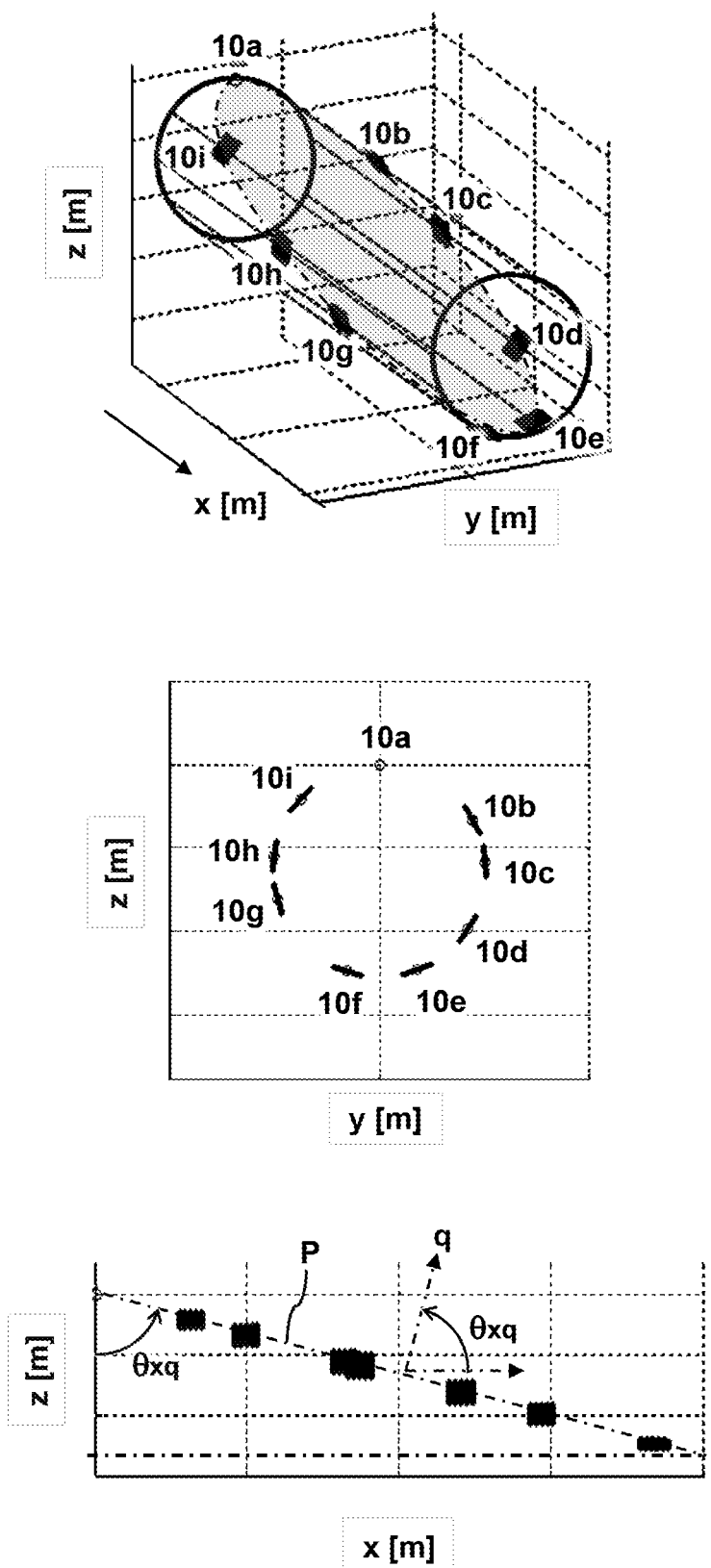
FIG. 2 illustrates different views of calculated positions according to an optimized arrangement of transceivers in an oblique plane.

FIG. 2 illustrates different views of calculated positions according to an optimized arrangement of transceivers 10a-10i.

In some embodiments, the number and distribution of transceivers is optimized for measuring a fluid flow according to a predetermined model. Typically, the number of transducers is between five and sixty-four, preferably between eight and twelve. The optimal number of transducers depends amongst other things on the complexity of the fluid flow F, its velocity range, the complexity of the liquid (e.g. single phase or multi phase liquids) and the signal-to-noise ratio's of each measurement. Preferably, the transducers are distributed around the fluid flow F to maximally sample the different flow regions with different sets of sub-lengths intersecting the flow regions. In a preferred embodiment, the transducers are distributed non-equidistantly around a circumference of the fluid flow F. For example, some or all of the distances between neighboring transceivers are different (e.g. as shown in the middle figure, measured tangential to the wall as viewed in a direction x of the flow) This may maximize the total amount of information present in the measurements. If symmetry existed in the transducer locations it would mean that some paths would be equal at least if thee the velocity map is axisymmetric. Most preferably, the transducers are distributed around a circumference of a pipe, wherein the inner shape of the (roughly) circular shaped pipe is left unaltered compared to the pipes which are used up and downstream of the rheology meter. Keeping the shape unaltered may e.g. prevent affecting the local velocity field and pressure differential.

Figure 3A:
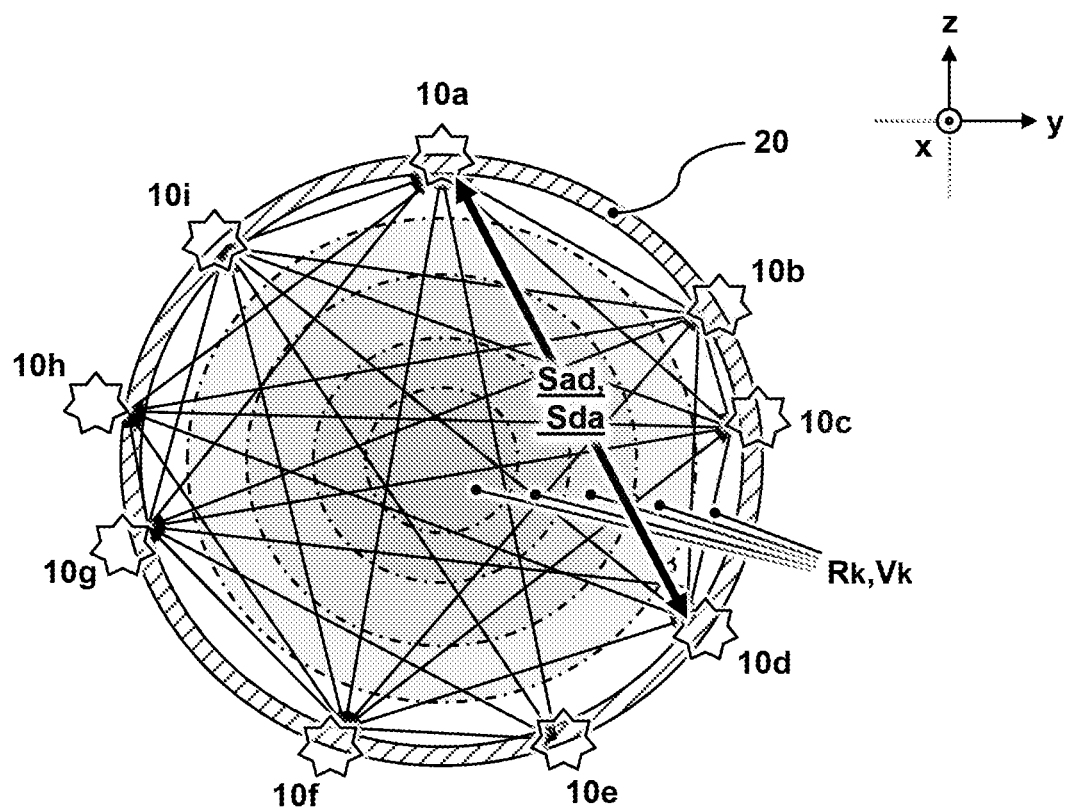

FIG. 3A schematically illustrates an arrangement of transceivers 10a-10i and the acoustical paths though the fluid flow there between. This is a cross-sectional view along the direction of flow (x) wherein the plane of the receivers is actually tilted. In a preferred embodiment, the transceivers are omnidirectional. In another or further embodiment, the transceivers are configured to transmit and/or receive acoustic signals in multiple directions through the fluid flow F. For example, one or more, preferably each transceiver can form respective transmitting/receiving pairs with multiple other transceivers, preferably each of the transceivers can form a respective pair. For example, a limited number of M transceivers can be used to form $M \cdot (M-1)/2$ pairs, or $M \cdot (M-1)$ different acoustic measurements (upstream and downstream are different).

Figure 3B:
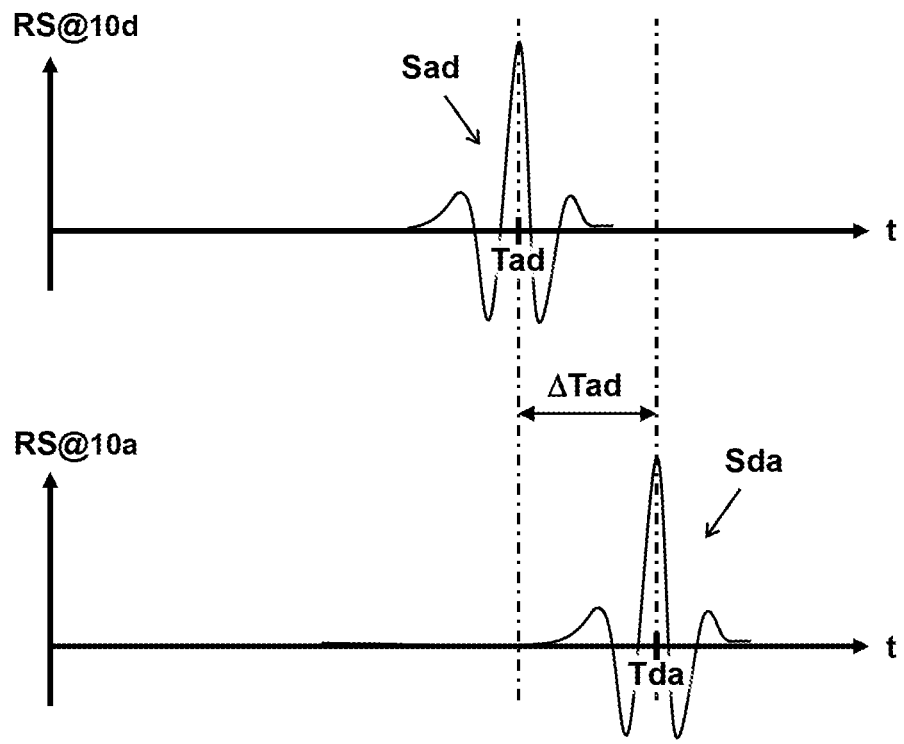
FIG. 3B schematically illustrates measurement of time intervals of acoustic signals between transceivers in a transceiver pair.

FIG. 3B schematically illustrates measurement of time intervals Tad,Tda of acoustic signals Sad,Sda between transceivers 10a and 10d. The exact shape of the received signals RS at the receivers may vary. Generally, a characteristic feature in the signal is used to identify the time of arrival. This can be e.g. the earliest measured signal. Also, other features of the signal can be used, e.g. a relatively large peak in the signal to distinguish from any background signals (not shown here). In one embodiment, the times of arrival (average up and downstream measurements) are used to measure the acoustic wave speed. In another or further embodiment, the relative time difference is determined to get the time interval Tad,Tda. For example, there may exist signal processing which can do this more accurately then determining the time interval from the times of arrival. In any case, by using the same characteristic in both the upstream and downstream signal, the time difference ΔTad may reflect the relevant time, even if there is a systematic delay in the recording of both signal.

In a preferred embodiment, the two time intervals Tad,Tda between a pair of transceivers 10a,10d are measured in close succession, e.g. within one millisecond, or even simultaneous. In this way the fluid flow sampled by the two signals is virtually the same. In some embodiments, multiple transceiver pairs, or even all transceivers, may be transmitting/receiving at the same time. For example, each transceiver may transmit a signal that can be distinguished from other signals. For example, the signals can be distinguished based on one or more of a different frequency, phase, chirp, encoding, et cetera. In some embodiments, the phases of the signals are tuned such that they cancel for some combinations of signals while constructively interfering for other combinations.

Figure 4A:
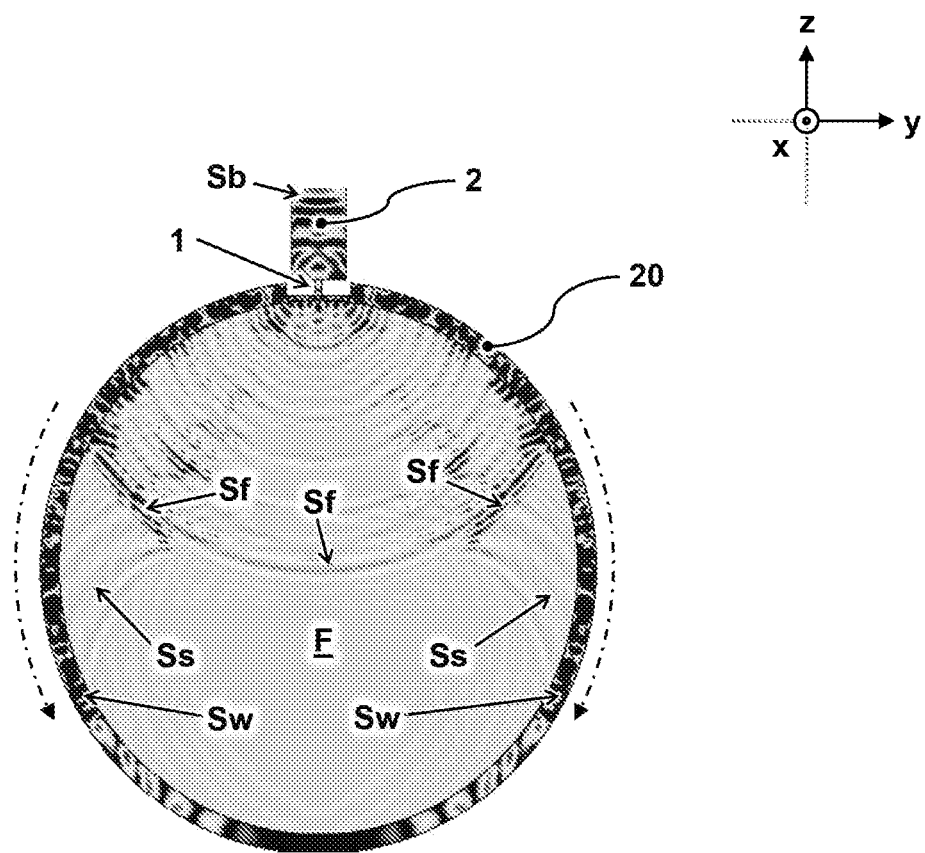
FIGS. 4A and 4B illustrates a simulation of signal propagation and measurement according to an embodiment without damping.
Figure 4B:
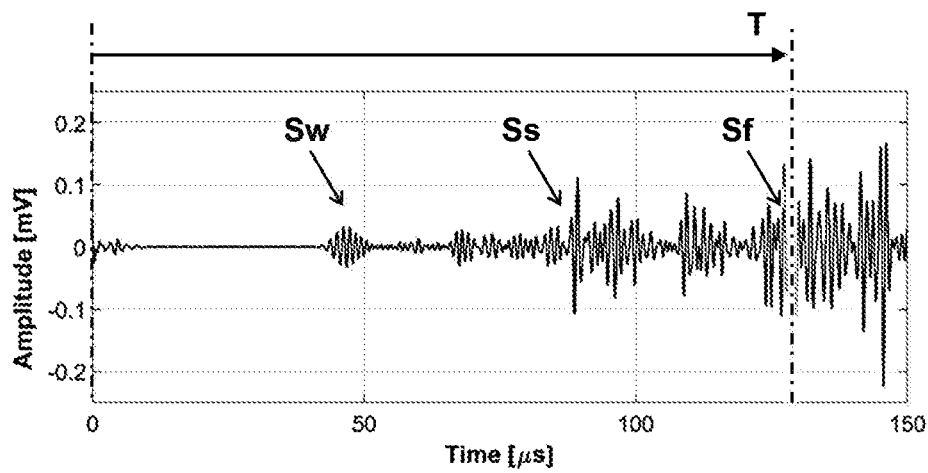

FIGS. 4A and 4B illustrates a simulation of signal propagation and measurement according to an embodiment without damping. FIG. 4A illustrates the signals generated by an acoustic transducer 1 placed against a pipe wall 20 containing the fluid flow F. The resulting signals include the desired acoustic signal Sf traversing the fluid flow F. By using a suitable backing structure 2, echoes of the generated signal traveling backwards (away from the wall) can be suppressed. However, also other signals can be generated including an undesired acoustic signal Sw traversing along the pipe wall 20 (guided waves). Because the wave velocity in the wall can be much higher than the wave velocity in the liquid, this signal may arrive relatively early as can be seen in FIG. 4B. Moreover, the acoustic signal Sw traveling along the wall 20 may cause secondary acoustic signals Ss along its path also into the fluid flow F. This may cause further interference in the measured signal as shown in FIG. 4B. In one embodiment, an algorithm is used to determine the velocity map, wherein the algorithm assumes a particular travel path and sound speed for each wave according to the layout of transceivers. The spurious waves can both have a different travel path (partly through the liquid and partly through the wall) and a different wave speed. Accordingly, the measurement of the desired signal Sf, in particular the time of arrival T through the fluid can be complicated.

Figure 5A:
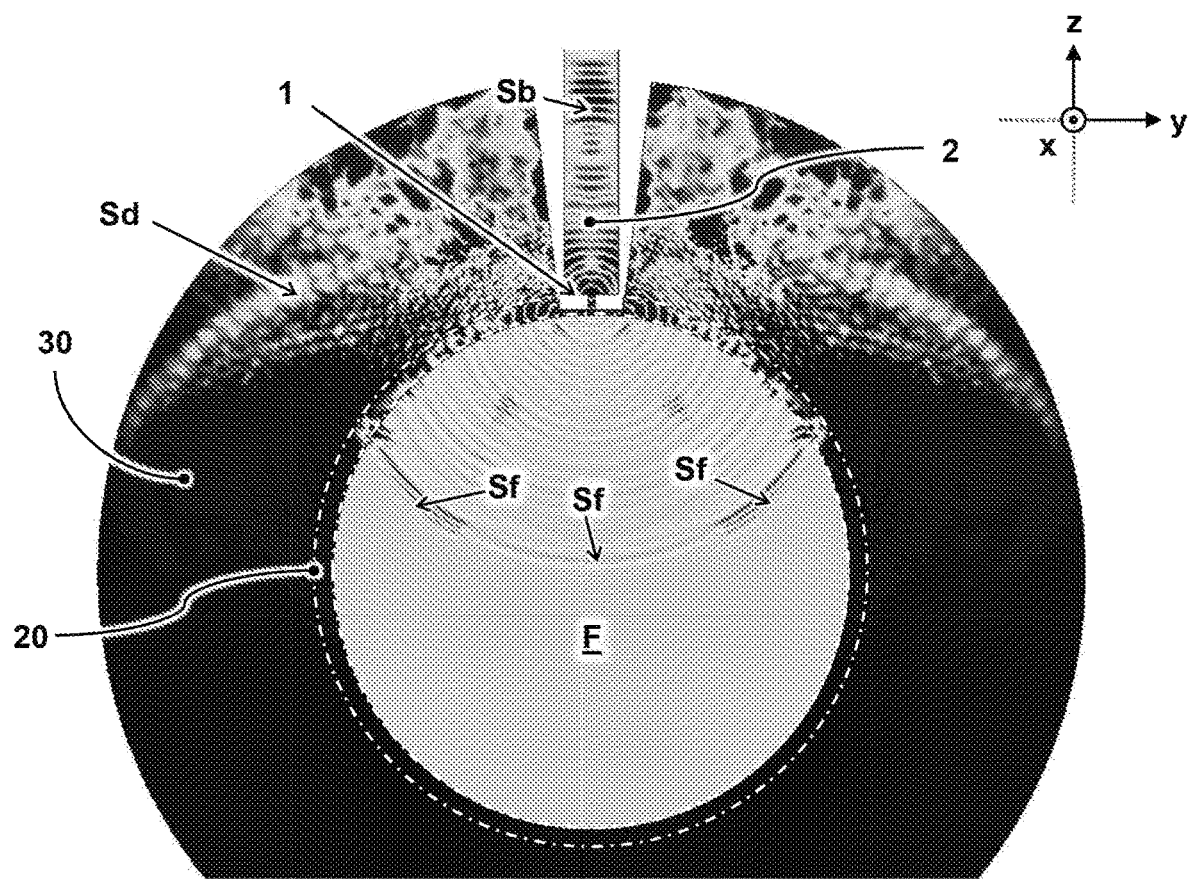
FIGS. 5A and 5B illustrates a simulation of signal propagation and measurement wherein acoustic signals propagating along the wall are damped.
Figure 5B:
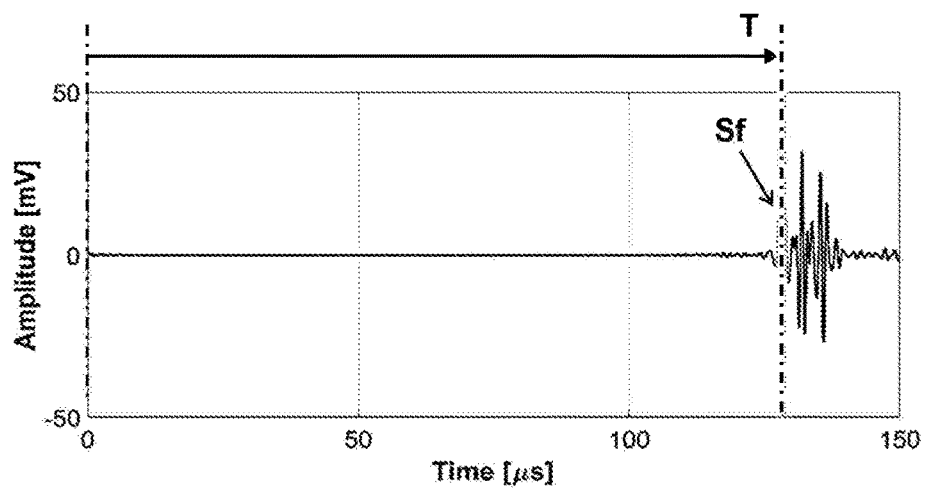

FIGS. 5A and 5B illustrates a simulation of signal propagation and measurement wherein acoustic signals propagating along the wall 20 are damped by a damping structure 30. The damping structure 30 e.g. comprises material that absorbs acoustic signals otherwise traversing along the wall 20. For example, acoustic signals Sd may instead be coupled into the 30 and be dissipated therein. As a result, the desired signal Sf through the fluid flow F may have relatively less interference and the relevant arrival times/time interval can be more easily detected, as shown in FIG. 5B.

Figures 6A, 6B:
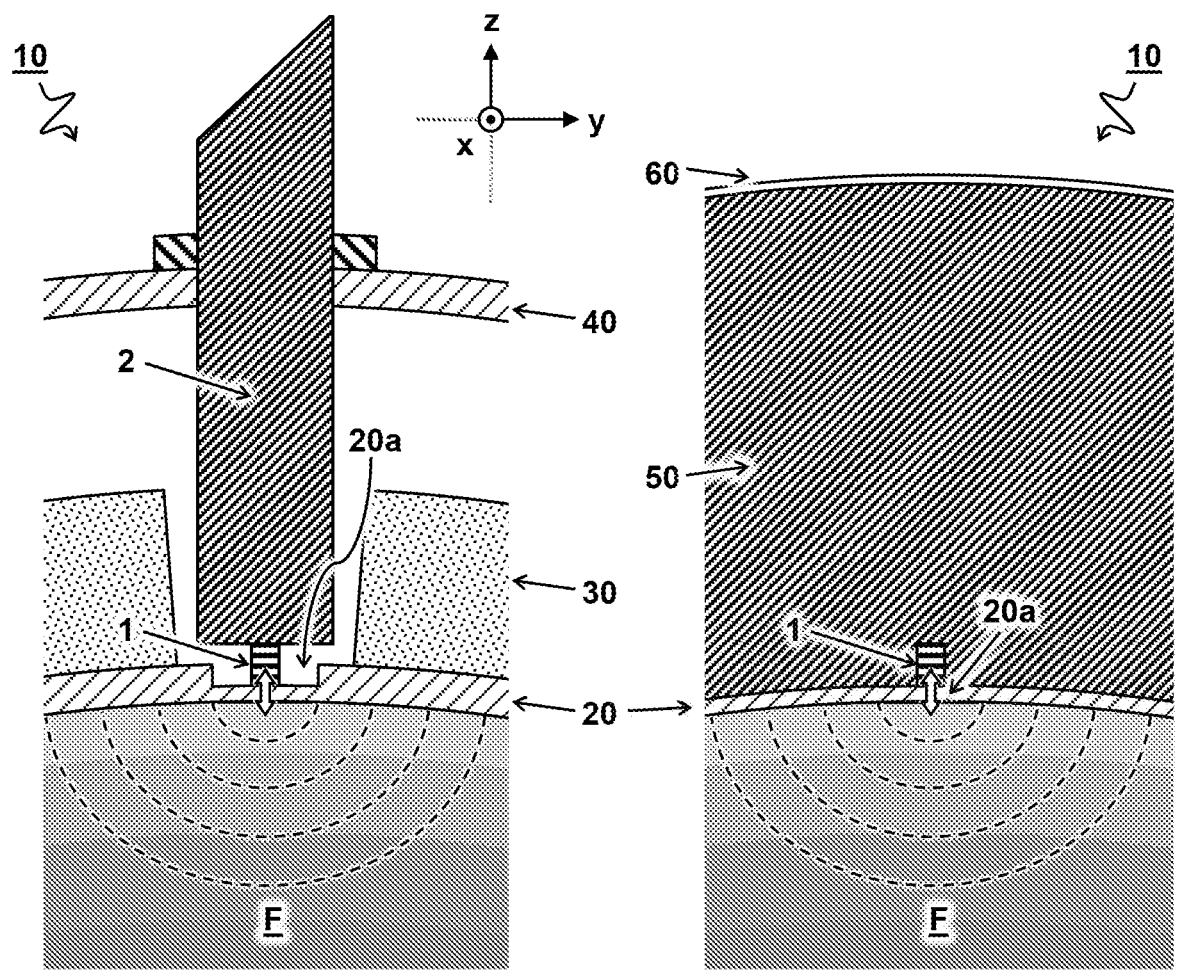
FIG. 6A schematically illustrate an embodiment of an acoustic transceiver against a wall containing the fluid flow.
FIG. 6B schematically illustrate another embodiment of an acoustic transceiver against a wall containing the fluid flow.

FIG. 6A schematically illustrate embodiment of an acoustic transceiver 10 against a wall 20 containing the fluid flow F.

In one embodiment, the transceiver 10 comprises an acoustic transducer 1. For example, the acoustic transducer 1 is configured to convert electrical signals into acoustic signals and/or vice versa. In a preferred embodiment, the acoustic transducer 1 comprises a vibration element, e.g. piezo element. Also other transducing elements can be used such as EMATs, lasers, magnetostrictive elements, et cetera. In a preferred embodiment, each of the transceivers is configured for both transmitting and receiving acoustic signals. Alternatively, some of the transceivers are configured to transmit signals and other transceivers are configured to receive signals.

In some embodiments, the transceivers 10 are connected via the acoustic transducer 1 to a wall 20 containing the fluid flow F. In a preferred embodiment, a respective local wall piece 20a acts as part of the respective transceiver 10 connected to that local wall piece 20a. For example, the transceivers 10 are connected to the outside of the wall and the fluid flows at the inside, e.g. inside a pipe wall. In some embodiments, acoustic signals in the fluid flow F are generated by the acoustic transducer 1 bringing the local wall piece 20a into vibration from the outside of the wall 20. For example, the local wall piece 20a brought into vibration by the acoustic transducer 1 is in connection with the fluid flow F on the inside of the wall 20. Advantageously, the inside of the wall can be free of any protruding elements that may otherwise affect the fluid flow F to be measured.

In one embodiment, the acoustic transducer 1 is connected at one side against the local wall piece 20a and at the other side against a backing structure 2. For example, the backing structure 2 is configured to keep the acoustic transducer 1 pressed against the wall. In another or further embodiment, the backing structure 2 is configured to absorb or deflect vibrations going into the backing structure 2 to prevent an echo signal. In some embodiments the backing structure 2 is held by a support frame 40. For example, the frame is concentrically placed around a pipe holding a plurality of transceivers from different sides against the pipe wall.

In one embodiment, the wall 20 or at least the piece of wall 20a with the connected transceiver 10 is relatively thin, preferably less than a wavelength of the acoustic signal in the wall, more preferably less than half or even less than one tenth the wavelength. Typically, the acoustic signal is an ultrasonic signal, e.g. in a MHz range, above 0.01, above, 0.1, above 1, or above 10 MHz. In one embodiment, the wall thickness is less than one millimeter, e.g. between 0.9 and 0.05 mm, preferably between 0.1 and 0.8 mm, or between 0.3 and 0.5 mm. For example, the transceiver 10 is connected to a slot in the wall 20 formed by a locally thinned wall piece 20a.

In some embodiments, the transducer is designed to include the wall as a separate layer of said transducer. In other or further embodiments, a slotted part of the wall is used as a sort of membrane, driven by the piezo element. For embodiments where the wall is used as a 'membrane' there may be an extra resonance effect of the wall, e.g. providing extra amplitude which may be at the cost of the frequency bandwidth. It will be appreciated that the slot is not needed, e.g. if the wall is relative thin everywhere. If the wall thickness is relatively high, e.g. higher than the wavelength of the acoustic signal, the opening angle may become limited according to Snell's law. Conversely, for a sufficiently thin wall, the opening angle of the acoustic signal emitted into the fluid can be relatively high i.e. act more omnidirectional. By using omnidirectionality the number of acoustic paths between different transceivers can be maximized. Most preferably, omnidirectional sources and receivers (omnidirectional in terms of the compressional wave in the liquid) are used without puncturing the pipe wall e.g. by incorporating the pipe wall in the piezo design. It will be appreciated that not puncturing or modifying the pipe wall is preferable, e.g. as an intrusive measurement may otherwise change the flow to be measured (the viscosity as function of the shear rate, since the local pressure drop and velocity profile would change compared to the velocity profile everywhere else) and if the pipe wall material is locally changed the chemical resistance and pressure robustness may suffer.

FIG. 6B schematically illustrate an embodiment of an acoustic transceiver 10 against a wall 20 containing the fluid flow F. In the embodiment shown, the whole wall is relatively thin. In a preferred embodiment, the mechanical integrity of such a thin wall is supported by a backing layer 50 from the outside. Advantageously, the backing layer 50 may also comprise damping material to attenuate acoustic signals otherwise traveling along the wall. In other or further embodiments, the acoustic transducer 1 is supported at one side against the backing layer 50 and at the other side against the local wall piece 20a.

In some embodiments, the damping structure 30 and/or backing layer 50 is formed from a liquid or foam precursor material that can e.g. be contained by an backing container wall 60, while hardening. For example, the backing layer and/or damping structure comprises a material preferably with high stiffness and/or density such as epoxy. In some embodiments, the epoxy comprises particles such as tungsten for further improving the stiffness/density and the sound attenuation. In a preferred embodiment, the coupling of the spurious guided wave from the steel wall into the backing material is better than the coupling into the fluid.

Figure 6C:
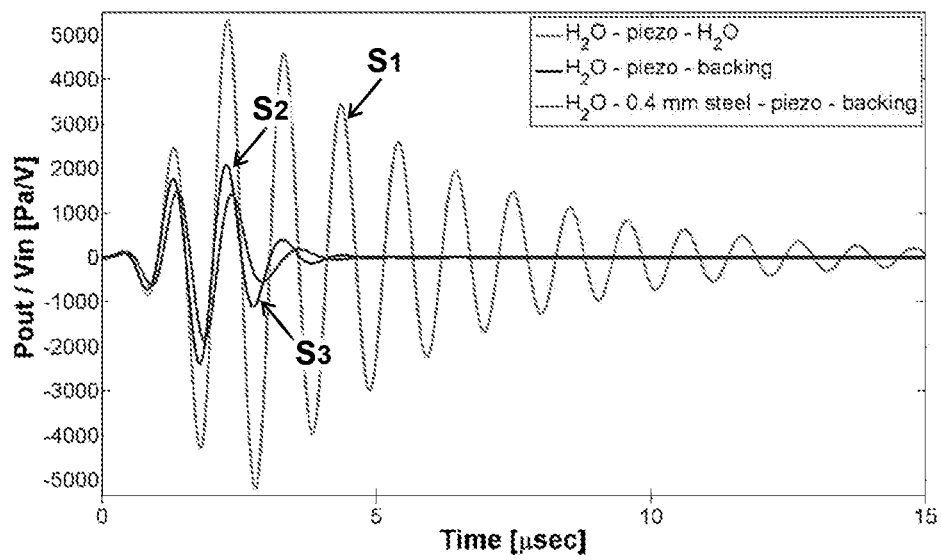
FIG. 6C illustrate a simulation of output signals.

FIG. 6C illustrate a simulation of output signals for a piezo in various circumstances. The signal S1 represents the expected amplitude in water resulting from a piezo placed directly in the water. The signal S2 represents the amplitude resulting from a piezo placed directly in the water on one side and supported by a backing structure on the other side. It will be appreciated that the signal can be relatively shorter. Shorter signals are generally useful, e.g. because it is easier to separate the interfering signals from the desired signal. Also, the accuracy with which the flow can be measured may depends on the bandwidth and length of the signal. In the simulation shown, a pulse excitation is used wherein a shorter signal corresponds to larger bandwidth. In practice it is also possible to use a chirp signal plus chirp compression, wherein the length of the signal may be increase while still retaining large bandwidth. Typically limitations may exist in the design in the bandwidth department, not in the length of the time signals.

The signal S2 represents the amplitude in water resulting from a piezo placed at the other side of a 0.4 mm steel wall against a backing structure. It will be appreciated that the signal S3 of a piezo at the other side of the wall is almost the same as that the signal S2 of the piezo placed in the water. This shows that the (thin) wall can effectively form part of the transceiver. In a preferred embodiment, the acoustic signals transmitted by the transceivers 10a-10f are relatively short, e.g. less than ten microseconds, less than five microseconds, or even less than one microsecond (the exact number also depends on the frequency). Preferably, a time resolution with which the acoustic signals are measured is less than one microsecond, less than 0.1 microsecond, or even less, e.g. between 0.1-10 ns. Typically, the time resolution may depend on various circumstances including the path lengths (hence the diameter of the pipe, the angle $\theta_{ad}$, and the distribution of the transducers), the frequency of the signals and the sound speed in the liquid.

Figure 7A:
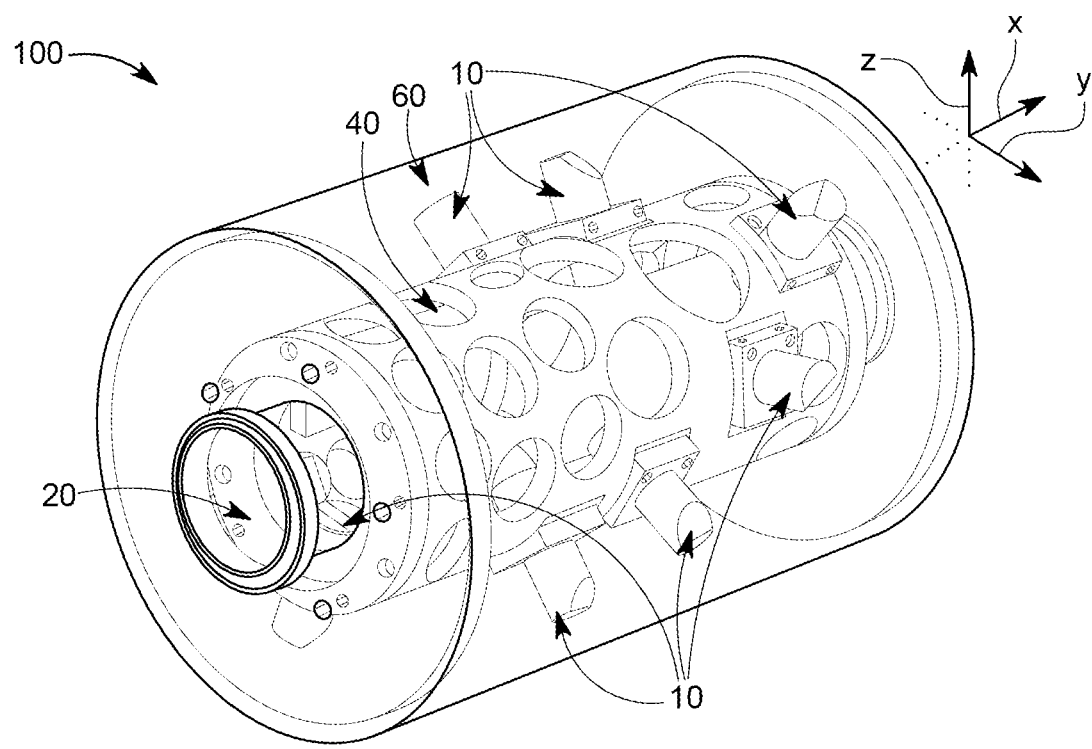
FIG. 7A schematically illustrates an embodiment of a system for measuring a fluid flow.
Figure 7B:
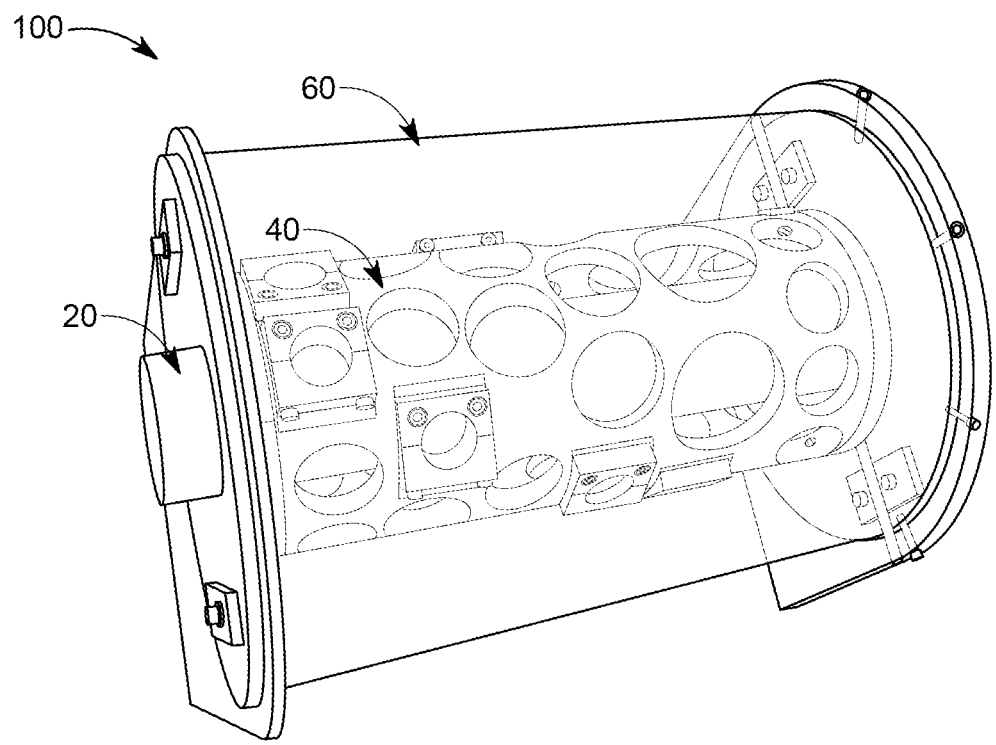
FIG. 7B illustrates an embodiment of the system.

FIG. 7A schematically illustrates an embodiment of a system 100 for measuring a fluid flow; FIG. 7B illustrates an embodiment of the system 100.

In one embodiment, the system 100 comprises a plurality of transceivers 10, as described herein. The transceivers 10 are disposed at predetermined locations distributed along a perimeter around the fluid flow. For example, the fluid flows through a flow guide, e.g. tube 20 and the transceivers are arranged around a perimeter of the flow guide. In the embodiment shown, the transceivers 10 are held by a support frame 40

Typically, the system 100 comprises or interacts with a controller (not shown). In some embodiments, the controller is configured to control the transceivers to measure the different time intervals between respective times of transmitting and receiving the acoustic signals along the plurality of different acoustic paths. In other or further embodiments, the (same or other) controller is configured to calculate a velocity map of the fluid flow by fitting the measured different time intervals to a model of the fluid flow, wherein the model of the fluid flow defines the velocity map with different flow velocities in a cross-section plane transverse to the fluid flow. The controller, e.g. computer, may include hardware such as a processor to execute software to perform specific functions. The software, if any, may be stored on a tangible non-transient computer-readable medium (such as a hard drive and/or memory) in the form of computer-executable instructions.

It will thus be appreciated that some functionality as described herein can be embodied as a controller and/or data carrier storing instructions in software and/or hardware, which instructions may cause a suitable system to execute operational acts in accordance with the methods as described herein. For example, the controller may instructions, and in response perform various steps as defined by the instructions. Various steps, such as calculations may be implemented, for example, by reading and executing computer-executable instructions and/or measurement data. Additionally, or alternatively, some or all functionality may be implemented by hardware of the controller, with or without the execution of software. For example, the controller may be or include an application-specific integrated circuit (ASIC), field-programmable gate array (FPGA), or other type of circuitry that is configured to perform at least some of the functions as described herein.

Figure 8:
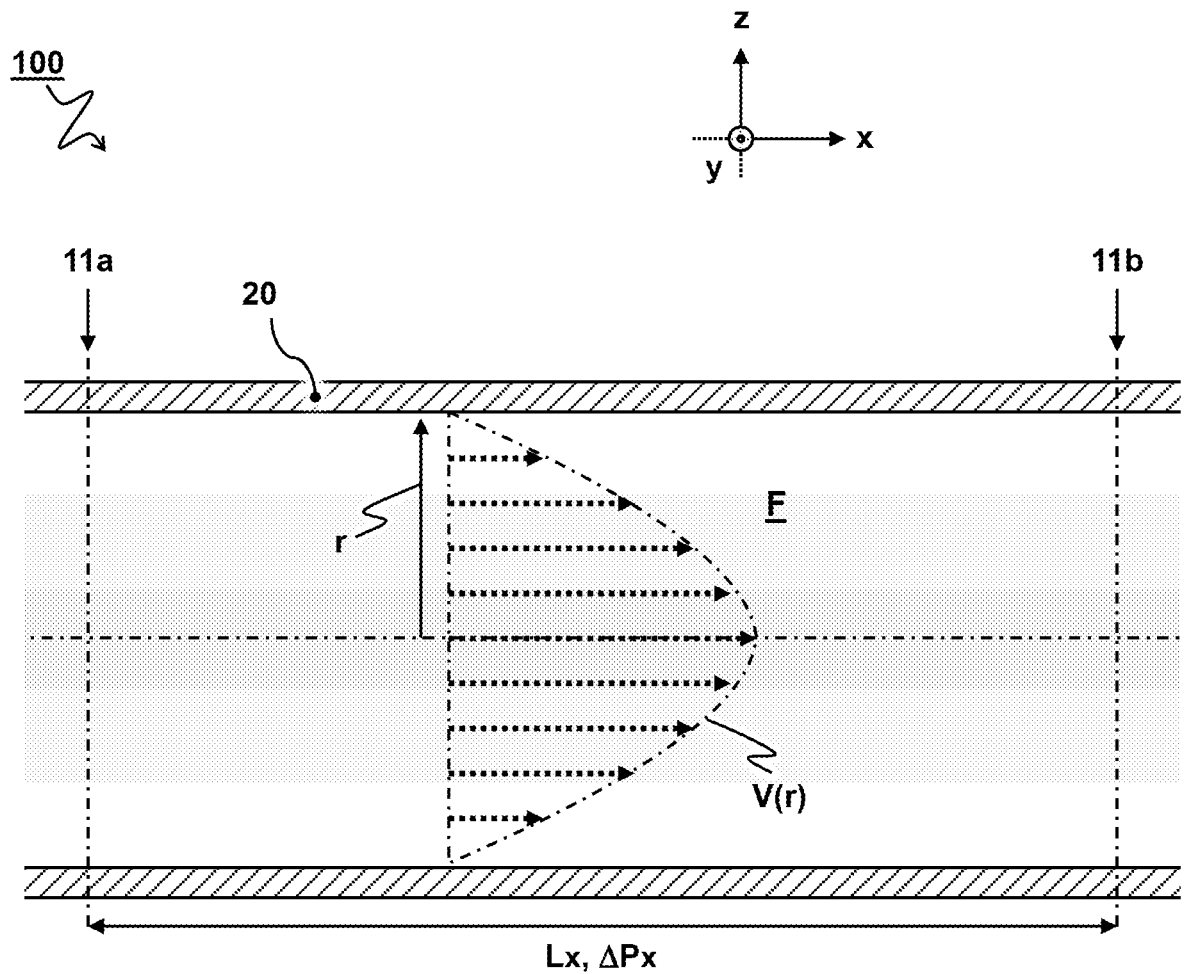
FIG. 8 schematically illustrates a pipe containing a fluid flow with a velocity map or profile.

FIG. 8 schematically illustrates a pipe wall 20 containing a fluid flow F with a velocity map V. In the embodiment shown, the system further comprises pressure sensors 11a, 11b to measure a pressure differential ΔPx over a length Lx along of the fluid flow F.

In some embodiments, rheological parameters are derived using the velocity map V. The reverse is also possible e.g. the velocity map is calculated based on, or constrained by, a model of rheological parameters. In some embodiments, a fluid viscosity η is calculated based on the flow velocity V. In other or further embodiments, a shear rate $\dot{\gamma}$ is calculated based on the flow velocity V. In other or further embodiments, a shear stress τ is calculated based on the flow velocity V. In other or further embodiments, a rheogram is calculated of the shear rate versus shear stress.

For example, a velocity map V(r) flowing in a tube can be differentiated with respect to the radial coordinate "r" to determine a shear rate, e.g. using $$\dot{\gamma}(r) = -\frac{d}{dr}V(r)$$

Optionally, by combining the local shear rate $\dot{\gamma}$(r) with the local shear stress τ(r), the local apparent viscosity η(r) can be determined, e.g. using $$\eta(r) = \frac{\tau(r)}{\dot{\gamma}(r)}$$

For example, the local shear stress τ(r) can be derived from a pressure difference $\Delta P_x$ over which can be measured between a length $L_x$ of the pipe, e.g. using:

$$\tau(r) = \frac{\Delta P_x}{2L_x}r$$

Optionally the viscosity η can also be calculated as function of the shear rate γ, e.g. to produce a rheogram. While the present examples relate to the fluid flow in a round tube other shapes may be envisaged which may alter the constraints on the flow model and/or the derivations of rheological parameters.

Figure 9A:
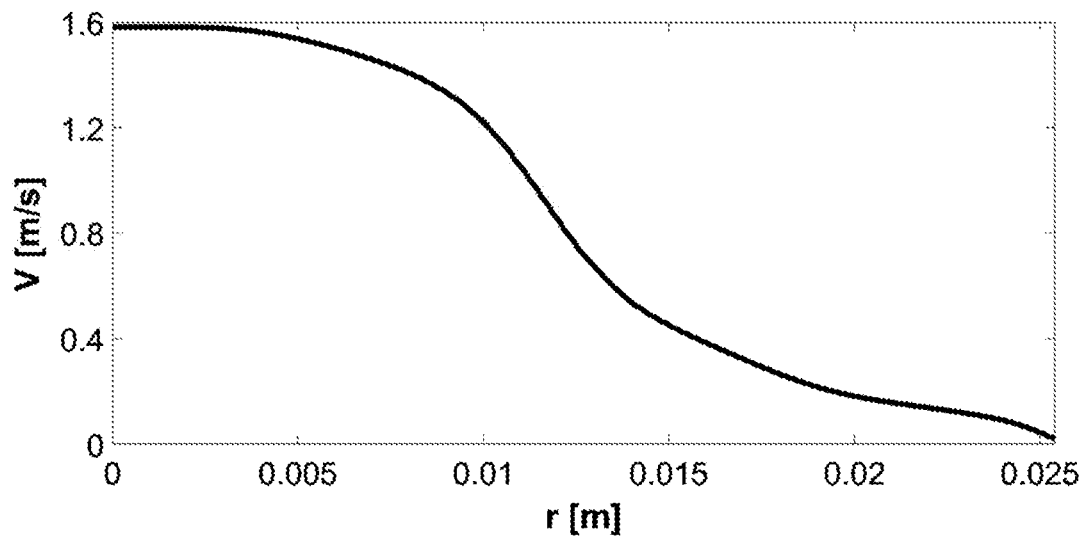
FIG. 9A illustrates a graphs of a velocity profiles based on measurement of different fluids.
Figure 9B:
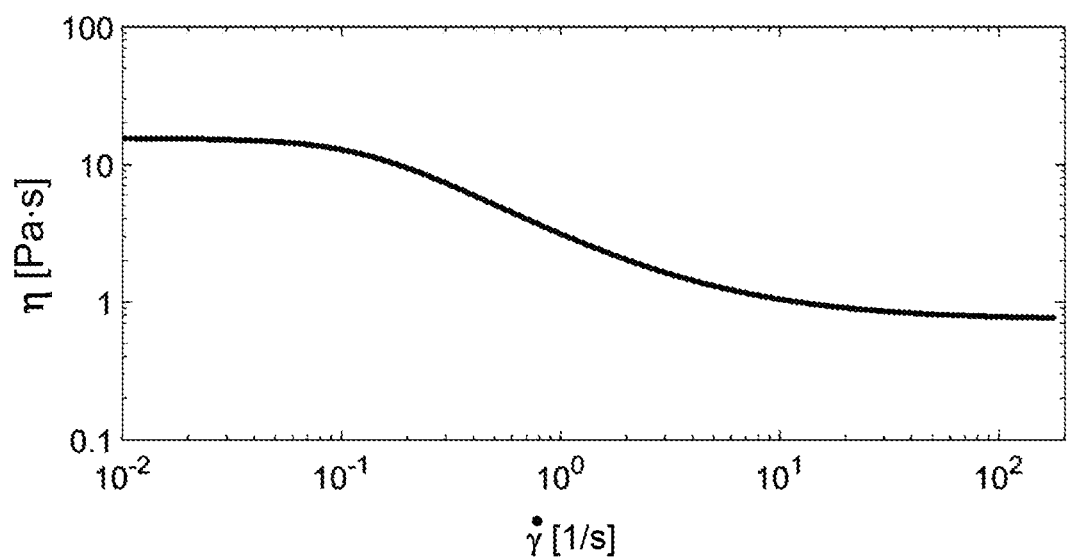
FIG. 9B illustrates graphs of a corresponding viscosity as a function of shear rate.

FIG. 9A illustrates a graph of an axisymmetric velocity profile V measured according to the methods described herein. FIG. 9B illustrates a graph of the corresponding viscosity η as a function of shear rate $\dot{\gamma}$ calculated based on the velocity profile in FIG. 9A using a Carreau model.

For the purpose of clarity and a concise description, features are described herein as part of the same or separate embodiments, however, it will be appreciated that the scope of the invention may include embodiments having combinations of all or some of the features described. For example, while embodiments were shown for specific arrangements of transceivers around a fluid flow, also alternative ways may be envisaged by those skilled in the art having the benefit of the present disclosure for achieving a similar function and result. E.g. transceiver components may be combined or split up into one or more alternative components. The various elements of the embodiments as discussed and shown offer certain advantages, such as non-intrusive measurement of fluid flowing inside a pipe. Of course, it is to be appreciated that any one of the above embodiments or processes may be combined with one or more other embodiments or processes to provide even further improvements in finding and matching designs and advantages. It is appreciated that this disclosure offers particular advantages to inline monitoring of fluid parameters such as viscosity, e.g. for accurately filling a container with a fluid, or adjusting a combination of two or more flows. In general the teaching may be applied for process benefitting from the measurement of a fluid flow.

In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. Where one claim refers to another claim, this may indicate synergetic advantage achieved by the combination of their respective features. But the mere fact that certain measures are recited in mutually different claims does not indicate that a combination of these measures cannot also be used to advantage. The present embodiments may thus include all working combinations of the claims wherein each claim can in principle refer to any preceding claim unless clearly excluded by context.

The invention claimed is:

1. A method for measuring a fluid flow, the method comprising:
    providing a plurality of transceivers disposed at predetermined locations distributed along a perimeter around the fluid flow and using the plurality of transceivers to transmit and receive acoustic signals through the fluid flow there between; wherein the plurality of transceivers comprise a plurality of transceiver pairs; wherein a respective transceiver pair forms a respective acoustic path through the fluid flow there between; wherein a plurality of different acoustic paths through the fluid flow are formed between different transceiver pairs;

measuring different time intervals between respective times of transmitting and receiving the acoustic signals; and along the plurality of different acoustic paths;

calculating a velocity map of the fluid flow by using the measured different time intervals with a model of the fluid flow, wherein the model of the fluid flow defines the velocity map with different flow velocities in a cross-section plane transverse to the fluid flow; wherein the velocity map is mapped onto respective lengths of each of the plurality of different acoustic paths to determine the different flow velocities along said lengths of the different acoustic paths in accordance with the velocity map; wherein the flow velocities along the lengths of the respective acoustic paths are used to calculate modeled different time intervals between the respective times of transmitting and receiving the acoustic signals along the plurality of acoustic paths; wherein the modeled different time intervals are fitted to the measured different time intervals in accordance with the velocity map.

2. The method according to claim 1, wherein the perimeter formed by the locations of the plurality of transceivers spans a flat transceiver plane through the fluid flow, wherein the flat transceiver plane has a normal vector that is at an oblique angle with respect to a main flow direction of the fluid flow, wherein the oblique angle is more than twenty degrees.

3. The method according to claim 1, wherein the transducers are distributed non-equidistantly around a circumference of the fluid flow.

4. The method according to claim 1, wherein the plurality of transceivers are omnidirectional, wherein each transceiver forms respective transmitting/receiving pairs with multiple other transceivers.

5. The method according to claim 1, wherein each transceiver comprises an acoustic transducer, wherein the plurality of transceivers are connected via their respective acoustic transducer to a wall containing the fluid flow, wherein a respective local wall piece acts as part of the respective transceiver connected to that local wall piece, wherein acoustic signals in the fluid flow are generated by the acoustic transducer bringing the local wall piece into vibration from the outside of the wall, wherein the local wall piece brought into vibration by the acoustic transducer is in connection with the fluid flow on the inside of the wall.

6. The method according to claim 1, wherein a thickness of a wall containing the fluid flow or at least the piece of the wall with a connected transceiver is less than a wavelength of an acoustic signal generated by the transceiver in the wall.

7. The method according to claim 1, wherein a wall containing the fluid flow is connected to a damping material configured to dampen acoustic signals traveling along the wall, transvers to a thickness of the wall.

8. The method according to claim 1, wherein the acoustic transducer is connected at one side against a local wall piece containing the fluid flow and at the other side against a backing structure, wherein the backing structure is configured to keep the acoustic transducer pressed against the local wall piece, wherein the backing structure is configured to absorb or deflect vibrations going into the backing structure to prevent an echo signal.

9. The method according to claim 1, wherein a first transceiver of a respective transceiver pair is upstream the fluid flow with respect to a second transceiver of the respective transceiver pair, wherein a first time interval is measured that it takes a first acoustic signal to travel downstream from the first transceiver to the second of transceiver, wherein a second time interval is measured that it takes a second acoustic signal to travel upstream from the second transceiver to the first transceiver, wherein a time difference between the first time interval and the second time interval is calculated, wherein the velocity map of the fluid flow is calculated based on a plurality of time differences between the measured time intervals of different transceiver pairs.

10. The method according to claim 1, wherein each acoustic path has a respective path angle with respect to a flow direction of the fluid flow, wherein the velocity map is calculated based also on the path angles for each of the different acoustic paths.

11. The method according to claim 1; wherein the model comprises dividing the fluid flow into flow regions having respective flow velocities; wherein each acoustic path intersect differently with the flow regions of the fluid flow according to a respective different set of sub-lengths of the intersecting acoustic path per flow region; wherein the flow velocities of the fluid flow are calculated based on the plurality of measured time intervals and sets of sub-lengths for the different acoustic paths, wherein each time interval of a respective acoustic path is associated with a respective set of sub-lengths for that respective acoustic path.

12. The method according to claim 1, wherein the flow velocity is modeled as a centrosymmetric flow, wherein the velocity map is an axisymmetric velocity profile.

13. The method according to claim 1, wherein the fluid flow is measured inside a round tube, wherein the fluid flow is modelled by dividing the flow into flow regions according to concentric cylinders through which the fluid flows in a flow direction along a length of the tube with a respective flow velocity.

14. A system for measuring a fluid flow, the system comprising:

a plurality of transceivers disposed at predetermined locations distributed along a perimeter around the fluid flow; wherein the plurality of transceivers are configured to transmit and receive acoustic signals through the fluid flow there between; wherein the plurality of transceivers comprise a plurality of transceiver pairs;

wherein a respective transceiver pair forms a respective acoustic path through the fluid flow there between; wherein a plurality of different acoustic paths through the fluid flow are formed between different transceiver pairs;

a controller configured to:
control the transceivers to measure different time intervals between respective times of transmitting and receiving the acoustic signals along the plurality of different acoustic paths; and
calculate a velocity map of the fluid flow by using the measured different time intervals with a model of the fluid flow,
wherein the model of the fluid flow defines the velocity map with different flow velocities in a cross-section plane transverse to the fluid flow;
wherein the velocity map is mapped onto respective lengths of each of the plurality of different acoustic paths to determine the different flow velocities along said lengths of the different acoustic paths in accordance with the velocity map;

wherein the flow velocities along the lengths of the respective acoustic paths are used to calculate modeled different time intervals between the respective times of transmitting and receiving the acoustic signals along the plurality of acoustic paths; wherein the modeled different time intervals are fitted to the measured different time intervals in accordance with the velocity map.

15. A non-transitory computer-readable medium storing instructions that, when executed by one or more processors, cause a system to perform a method comprising:

receiving measurements of different time intervals between respective times of transmitting and receiving acoustic signals through a fluid flow along a plurality of different acoustic paths formed between different transceiver pairs disposed at predetermined locations distributed along a perimeter around the fluid flow; and calculating a velocity map of the fluid flow by using measured different time intervals with a model of the fluid flow, wherein the model of the fluid flow defines the velocity map with different flow velocities in a cross-section plane transverse to the fluid flow;

wherein the velocity map is mapped onto respective lengths of each of the plurality of different acoustic paths to determine the different flow velocities along said lengths of the different acoustic paths in accordance with the velocity map;

wherein the flow velocities along the lengths of the respective acoustic paths are used to calculate modeled different time intervals between the respective times of transmitting and receiving the acoustic signals along the plurality of acoustic paths; and wherein the modeled different time intervals are fitted to the measured different time intervals in accordance with the velocity map.

* * * * *

UNITED STATES PATENT AND TRADEMARK OFFICE
CERTIFICATE OF CORRECTION

PATENT NO. : 11,175,165 B2
APPLICATION NO. : 16/641592
DATED : November 16, 2021
INVENTOR(S) : Van Neer et al.

It is certified that error appears in the above-identified patent and that said Letters Patent is hereby corrected as shown below:

On the Title Page

Item (73) Assignee:
Change "NEDERLANDSE ORGANISATIE VOOR TOEGEPAST-NATUURWETENSCHAPPELIJK ONDERZOEK TNO, The Hague (NL)" to "NEDERLANDSE ORGANISATIE VOOR TOEGEPAST-NATUURWETENSCHAPPELIJK ONDERZOEK TNO, s'Gravenhage (NL)"

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*